United States Patent
Donzel et al.

(10) Patent No.: US 12,406,821 B2
(45) Date of Patent: Sep. 2, 2025

(54) HIGH VOLTAGE BYPASS DEVICE, VOLTAGE SOURCE CONVERTER AND OPERATING METHOD

(71) Applicant: Hitachi Energy Ltd, Zürich (CH)

(72) Inventors: Lise Donzel, Wettingen (CH); Mats Andersson, Beijing (CN)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/865,016

(22) PCT Filed: May 16, 2022

(86) PCT No.: PCT/EP2022/063178
§ 371 (c)(1),
(2) Date: Nov. 12, 2024

(87) PCT Pub. No.: WO2023/222183
PCT Pub. Date: Nov. 23, 2023

(65) Prior Publication Data
US 2025/0112013 A1    Apr. 3, 2025

(51) Int. Cl.
*H02H 9/00* (2006.01)
*H01H 71/02* (2006.01)
(Continued)

(52) U.S. Cl.
CPC ............ *H01H 71/02* (2013.01); *H01H 71/08* (2013.01); *H02H 9/04* (2013.01)

(58) Field of Classification Search
CPC ........... H01H 71/02; H01H 71/08; H02H 9/04
(Continued)

(56) References Cited

U.S. PATENT DOCUMENTS 3,469,047 A * 9/1969 Daniel ................ H01H 33/126
337/28
8,169,145 B2 * 5/2012 Boy ......................... H01T 4/12
313/631
(Continued)

FOREIGN PATENT DOCUMENTS

| CN | 106537547 A | 3/2017 |
| CN | 106782955 B | 8/2018 |

(Continued)

OTHER PUBLICATIONS

International Search Report and Written Opinion of the International Searching Authority, ISA European Patent Office, issued in PCT/EP2022/063178, dated Jan. 5, 2023, 14 pages.

*Primary Examiner* — Jared Fureman
*Assistant Examiner* — Lucy M Thomas
(74) *Attorney, Agent, or Firm* — Procopio, Cory, Hargreaves & Savitch LLP

(57) ABSTRACT

The present disclosure relates to a high voltage bypass device, comprising a cavity, a trigger element arranged in the cavity, a reservoir filled with a conductive, flowable material, and a shutter separating the cavity and the reservoir. The trigger element is connected to a first terminal and a second terminal of the high voltage bypass device. The shutter is configured to open a passage between the cavity and the reservoir in case the trigger element is triggered by an overvoltage condition, such that the conductive, flowable material at least partially fills the cavity, thereby forming a conductive path from the first terminal to the second terminal. The present disclosure further relates to a voltage source converter (VSC), in particular a modular multi-cell converter, and an operating method for a high voltage bypass device.

17 Claims, 6 Drawing Sheets

(51) Int. Cl.
  *H01H 71/08*  (2006.01)
  *H02H 9/04*  (2006.01)
(58) Field of Classification Search
  USPC .......................................................... 361/56
  See application file for complete search history.

(56) References Cited

U.S. PATENT DOCUMENTS

| | | | |
|---|---|---|---|
| 2017/0148595 A1* | 5/2017 | Leemans | H01H 37/72 |
| 2018/0183230 A1 | 6/2018 | Kostakis et al. | |
| 2018/0287484 A1* | 10/2018 | Braginsky | H02J 3/381 |
| 2020/0044580 A1* | 2/2020 | Stankewitz | H02H 7/12 |

FOREIGN PATENT DOCUMENTS

| | | |
|---|---|---|
| CN | 211209604 U | 8/2020 |
| EP | 0603428 A1 | 6/1994 |
| EP | 3107198 A1 | 12/2016 |
| JP | S5957838 U | 4/1984 |
| WO | 2015173204 A1 | 11/2015 |
| WO | 2018149630 A1 | 8/2018 |

* cited by examiner

Fig. 1A
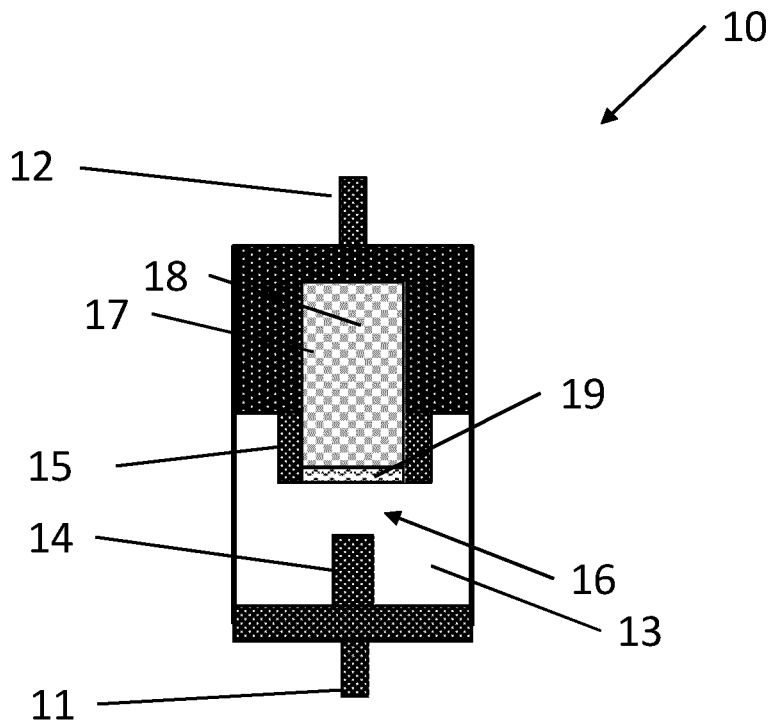
Fig. 1B
Fig. 1C
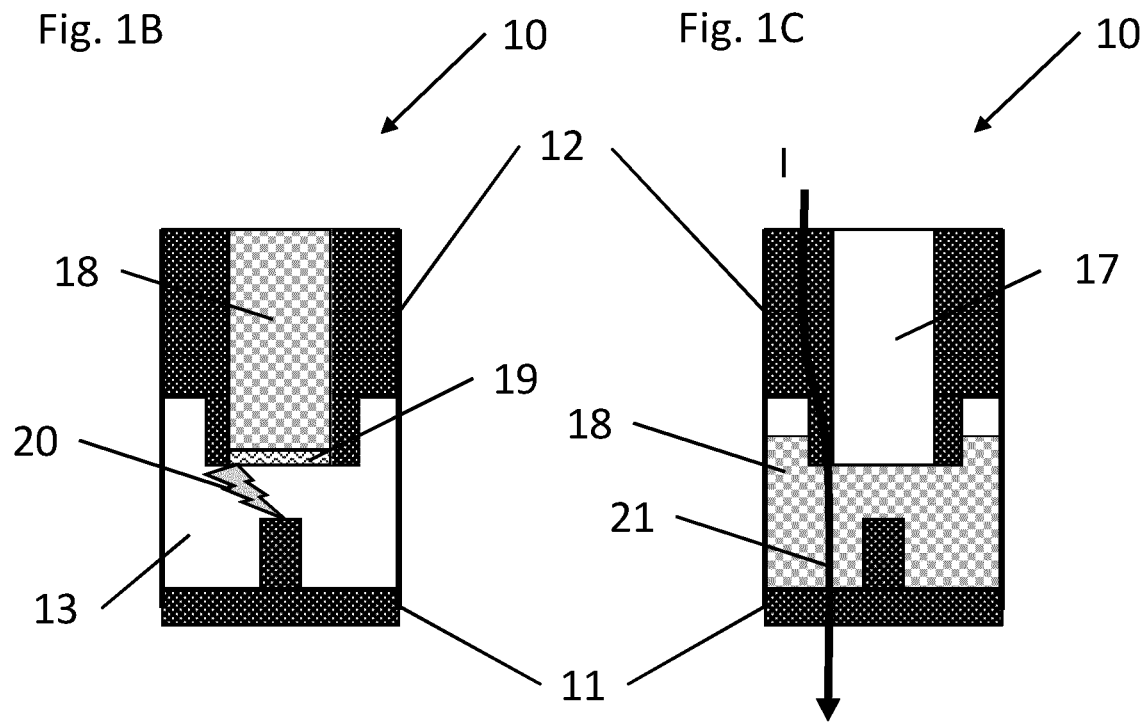

Fig. 2A
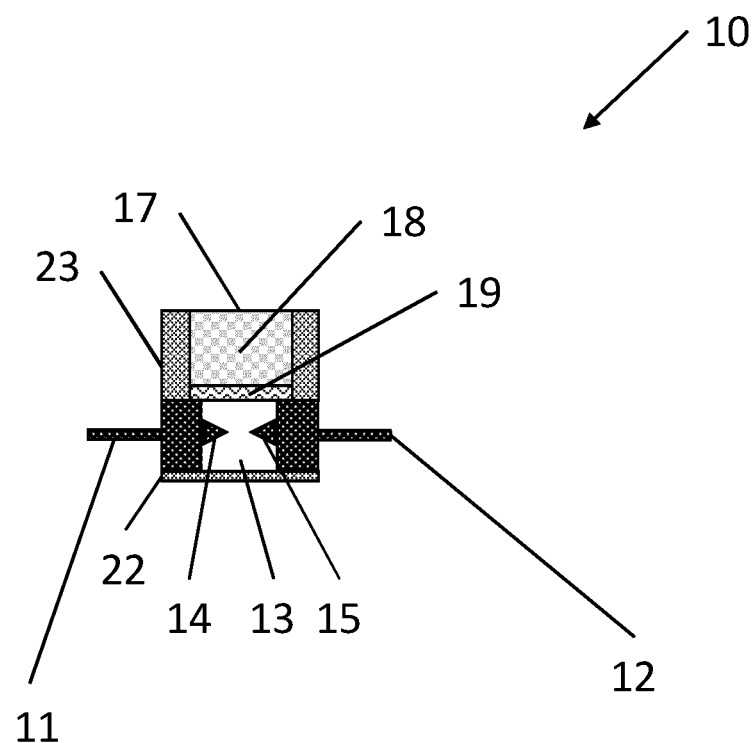
Fig. 2B
Fig. 2C
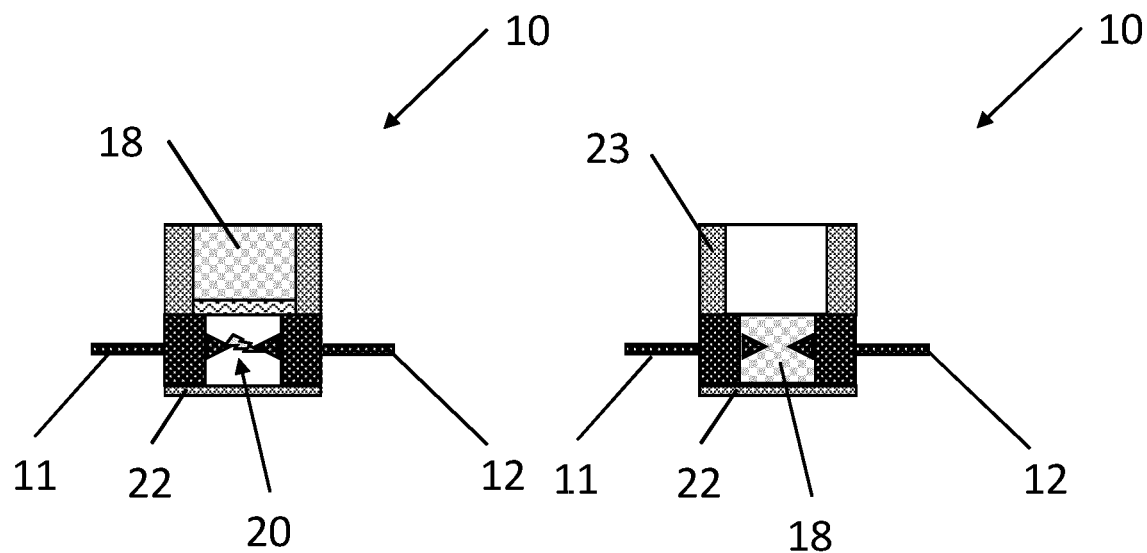

Fig. 5A
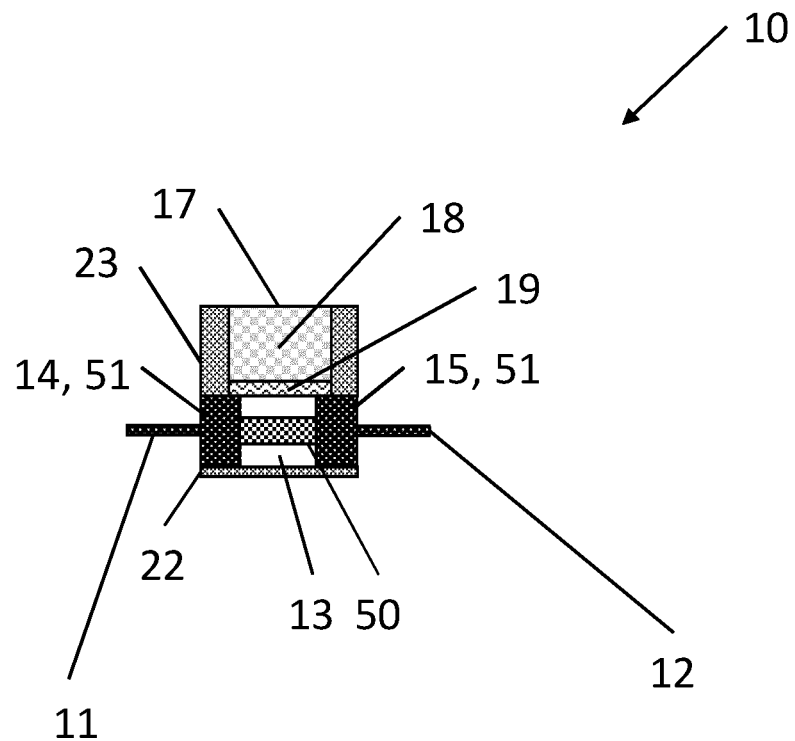
Fig. 5B
Fig. 5C
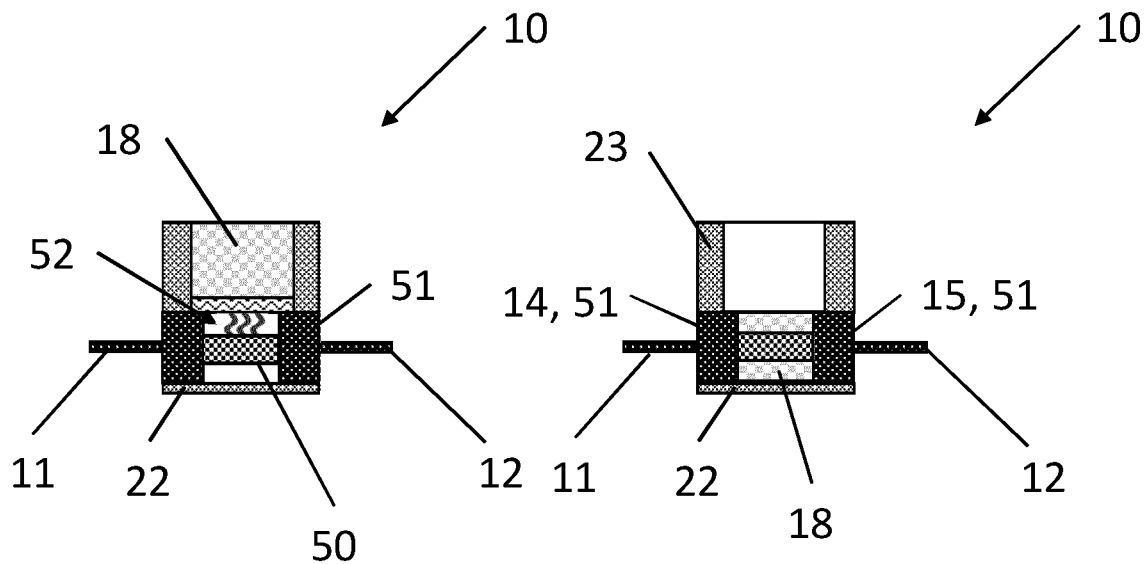

HIGH VOLTAGE BYPASS DEVICE, VOLTAGE SOURCE CONVERTER AND OPERATING METHOD

The present application is a national stage entry of International Patent Application No. PCT/EP2022/063178, filed on May 16, 2022, which is hereby incorporated herein by reference as if set forth in full.

The present disclosure relates to a high voltage bypass device, its application in a voltage source converter and an operating method for a high voltage bypass device.

High voltage (HV) installations, such as voltage converters operating in excess of one or more kV, often comprise a number of switching devices, such as power semiconductor switching devices, that selectively connect or disconnect two different voltage potentials. For example, so-called modular multi-cell converters (MMC) comprise a number of switching cells to generate a desired output voltage from a given input voltage. Such converters are useful, for example, in high voltage direct current (HVDC) transmission systems. As such installations form part of the critical infrastructure, they should operate reliably, preferably even in cases where individual components of a converter fail.

It is known to bypass a failed switching component using a mechanical bypass switch (BPS) or breaker. However, the provision of an additional electro-mechanical component adds complexity and significant cost to the overall installation. Alternatively, specific semiconductor protection devices may be employed. However, due to the large voltages and currents involved in HV installation, semiconductor-based protection devices typically require active cooling, which also adds complexity and significant cost to the HV installation. The added complexity and cost double, if these components are provided redundantly, e.g. to comply with reliability requirements.

The present disclosure provides alternative devices, systems and methods for ensuring reliable operation of HV installations.

According to a first aspect, a high voltage bypass device is disclosed. The device comprises a cavity, a trigger element arranged in the cavity, a reservoir filled with a conductive flowable material, and a shutter separating the cavity and the reservoir. The trigger element is connected to a first terminal and a second terminal of the high voltage bypass device. The shutter is configured to open a passage between the cavity and the reservoir in case the trigger element is triggered by an overvoltage condition such that the conductive material at least partially fills the cavity, thereby forming a conductive path from the first terminal to the second terminal.

The device according to the first aspect can bypass another device or part of a HV installation. Contrary to known bypass devices, the disclosed bypass device does not require any form of active control or forced cooling. Accordingly, such a device is relatively easy to construct and integrate, even in existing installations.

In at least one embodiment, the trigger element comprises a first electrode connected to the first terminal, and a second electrode connected to the second terminal, the first electrode and the second electrode extending into the cavity and forming a spark gap therein. Spark gaps are relatively easy to form and generate a spark in case of an overvoltage condition, which can be utilized to release the shutter almost instantly. Moreover, the electrodes forming the spark gap can form part of the conductive path after the bypass device is triggered.

In at least one embodiment, the trigger element comprises a varistor connected between the first terminal and the second terminal. Varistors have well known electrical characteristics. Among others, they can enter an electrically conductive state above a well-defined threshold voltage, known as clamping voltage. Due to the Ohmic losses in the conductive state, heat is generated by the varistor which can be utilized to release the shutter.

In at least one embodiment, the conductive, flowable material comprises at least one of a liquid, a powder and/or a granular material. Such materials can freely flow, for example under the influence of gravity or another external force, from the reservoir to the cavity.

In at least one embodiment, the conductive, flowable material comprises at least one of a metal or metal alloy, in particular gallium (Ga), Galinstan, mercury (Hg), aluminum (Al) or copper (Cu). Metal materials have a very high conductivity and are therefore suitable for carrying high currents typically occurring in HV installations.

In at least one embodiment, the trigger element is configured to generate heat in case of an overvoltage condition and the shutter comprises a heat sensitive material, in particular a polymer material, which is at least partially destroyed by one of melting, evaporation or combustion. Such materials can be engineered to reliably activate a shutter mechanism in case a spark or other predefined thermal event occurs within the cavity.

According to different embodiments, the shutter comprises either a heat sensitive membrane separating the cavity and the reservoir, or a heat sensitive trigger coupled to a spring loaded divider separating the cavity and the reservoir. Either solution provides a simple, mechanical shutter mechanism that can be activated by a heat created in case of an overvoltage condition.

In at least one embodiment, the reservoir is arranged above the cavity in a mounted position of the device, such that the conductive, flowable material is released by gravity when the trigger element is triggered and, as a consequence, the shutter is open. A gravity operated mechanism is particularly reliable and does not dependent on any external source of energy or control.

According to at least one embodiment, the trigger element comprises a first electrode connected to the first terminal, and a second electrode connected to the second terminal, the first electrode and the second electrode forming a spark gap. The first electrode is arranged at a bottom part of the cavity and protrudes upwards, and the second electrode is arranged at a top part of the cavity, in proximity to the shutter, and protrudes downwards. Alternatively or in addition, the first electrode is arranged at a first wall of the cavity and protrudes towards an opposite, second wall of the cavity, and the second electrode is arranged at the second wall of the cavity and protrudes towards the first wall of the cavity, wherein a direct path between the first and second electrode is in proximity to the shutter. These arrangements ensure that the energy of the spark will trigger the shutter mechanism reliably.

According to at least one embodiment, the trigger element comprises a varistor connected between the first terminal and the second terminal. The varistor is arranged in a central part of the cavity underneath the shutter. Alternatively or in addition, the varistor is arranged in direct thermal contact with the shutter. These arrangements ensure that heat generated by the varistor will trigger the shutter mechanism reliably.

According to at least one embodiment, the cavity is filled with one of vacuum or a protective gas before the trigger element is triggered. This may be advantageous in certain operating environments, where an unintentional discharge or chemical corrosion of the electrodes should be avoided.

In at least one embodiment, the conductive, flowable material is configured to form a permanent electrical path between the first and the second terminal after the trigger element is triggered. This may be achieved in different ways, for example by flooding the cavity with a conductive liquid, or by contacting a first and a second electrode extending into or bounding the cavity with a granular conducting medium. Formation of a permanent electrical pathway enables a HV installation to remain operational for a relatively long time, for example until a fault in another component has been identified and addressed.

According to a second aspect, a voltage source converter (VSC), in particular a modular multi-cell converter (MMC), is provided. The converter comprises at least one switching cell configured to switch a high voltage, and at least one high voltage bypass device according to the first aspect, which is configured to bypass the at least one switching cell in case of a failure.

A converter according to the second aspect remains partially or completely operational in case a switching cell turns out to be defective. In such a scenario, the switching cell can be bypassed by means of the high voltage bypass device, thereby providing a path for the current to bypass the cell.

In at least one embodiment, the switching cell comprises at least one power semiconductor switching device, in particular an IGBT, and the high voltage bypass device is connected in parallel to the at least one power semiconductor switching device. In this way, a core switching component of the switching cell can be bypassed.

According to at least one embodiment, the switching cell further comprises at least one mechanical bypass switch connected in parallel to the at least one power semiconductor switching device and the high voltage bypass device. Such a converter combines the advantages of a mechanical bypass switching device with the additional safety of the high voltage bypass device according to the first aspect. For example, a mechanical bypass switching device may be activated or deactivated by an external control signal and/or multiple times, or may have other advantages. The high voltage bypass device can be activated without external control in case the mechanical bypass fails to close. Moreover, it fulfils the requirement of providing redundant bypass components, thus avoiding the risks associated with a failure of a single safety component.

In at least one embodiment, the at least one switching cell has a voltage rating in excess of 1 kV, preferably in excess of 3 kV, and/or a current rating in excess of 100 A, preferably in excess of 1000 A.

In at least one embodiment, the at least one high voltage bypass device is triggered by an overvoltage exceeding a voltage rating of the switching cell by a factor of two or more.

In at least one embodiment, the at least one high voltage bypass device has an activation time of less than 10 ms for bypassing the at least one switching cell in case of an overvoltage condition.

In at least one embodiment, the at least one high voltage bypass device is configured to bypass the at least one switching cell for a period exceeding 24 hours, preferably exceeding 168 hours.

The above characteristics make the converter useful for typical voltages, currents, overvoltage conditions, switching times and operating times occurring in HV installations.

According to a third aspect, an operating method for a high voltage bypass device is disclosed. The method comprises:
  triggering a trigger element connected to two terminals of the bypass device in case of an overvoltage condition, in particular by creating heat through a spark or a ohmic heating;
  at least partially destroying, in particular by melting, evaporating or combusting, a shutter of the bypass device in response to triggering the trigger element, thereby releasing a conductive, flowable material; and
  at least partially filling a cavity of the bypass device with the conductive, flowable material, thereby creating a permanent electrical path between the two terminals of the bypass device.

The steps according to the third aspect implement a simple mechanism that does not require any external control and therefore reliably bypasses parts of a HV installation.

The present disclosure comprises several aspects of HV installations. Every feature described with respect to one of the aspects is also disclosed herein with respect to the other aspect, even if the respective feature is not explicitly mentioned in the context of the specific aspect.

The accompanying figures are included to provide a further understanding. In the figures, elements of the same structure and/or functionality may be referenced by the same reference signs. It is to be understood that the embodiments shown in the figures are illustrative representations and are not necessarily drawn to scale.

FIGS. 1A to 1C show a schematic cross-section through a first HV bypass device before, during and after occurrence of an overvoltage condition.

FIGS. 2A, 2B and 2C show a schematic cross-section through a second HV bypass device before, during and after occurrence of an overvoltage condition.

FIGS. 5A to 5C show a schematic cross-section through a third HV bypass device before, during and after occurrence of an overvoltage condition.

Figure 3:
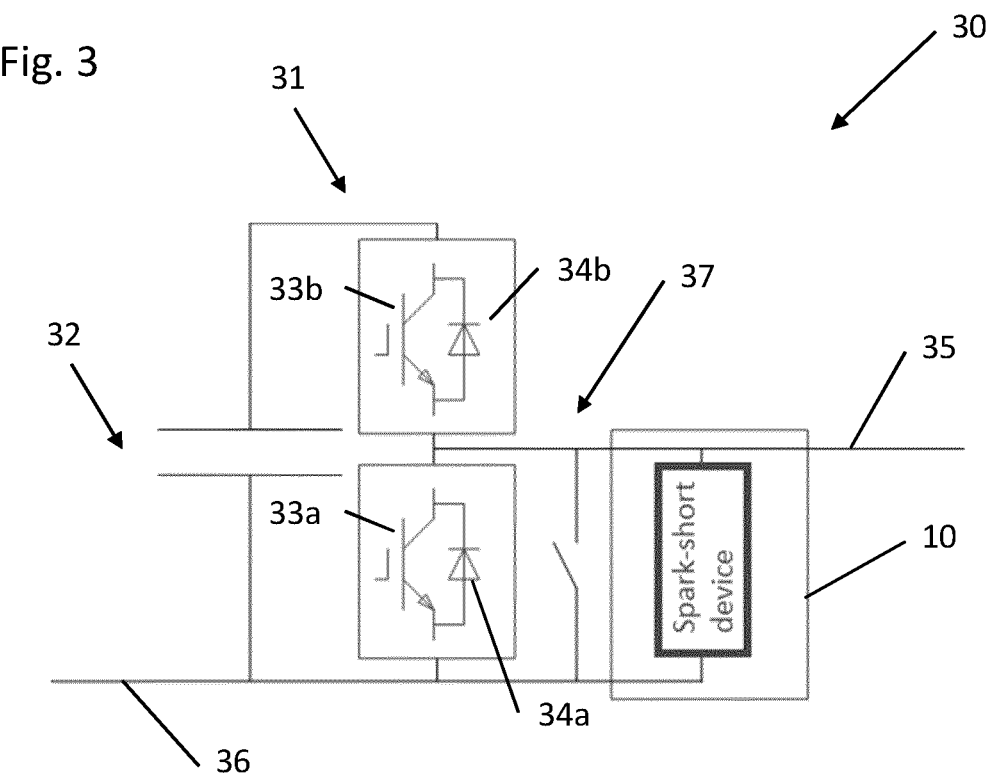
FIG. 3 shows a schematic circuit diagram of part of a voltage source converter comprising a single switching cell.

FIG. 1A shows, in a schematic manner, the functional parts of a first bypass device 10. The bypass device 10 comprises a first terminal 11 and a second terminal 12 for connecting the bypass device 10 with corresponding electrical connections of a device to be bypassed. For example, the bypass device 10 may be connected in parallel with a switching device, such as an IGBT, and/or a mechanical bypass switch to be shorted in case of malfunction of the respective device.

The two terminals 11 and 12 are electrically separated from one another by parts of an insulating housing or the like, thereby forming a cavity 13. Parts of the first terminal 11 form a first electrode 14 protruding into the cavity 13. Similarly, parts of the second terminal 12 form a second electrode 15 protruding into the cavity 13. Together, the first electrode 14 and the second electrode 15 form a spark gap 16 there between. The spark gap 16 acts as a trigger element for the first bypass device 10 and is triggered if an overvoltage condition occurs between the first terminal 11 and the second terminal 12. The value of the overvoltage triggering the bypass device 10 is determined by the shape and the distance between the two electrodes 14 and 15 as well as a potential atmosphere filling the cavity 13. According to one embodiment, a protective gas or vacuum may fill the cavity 13. For example, a voltage of 5 kV may trigger arcing of the spark gap 16.

In the bypass device 10 shown in FIG. 1A, the second terminal 12 forms the outside walls of a reservoir 17 filled with a conductive, flowable material 18. In the embodiment shown, the conductive, flowable material 18 is arranged in a central part of the second terminal 12, i.e. directly over the first electrode 14 in a mounted position of the bypass device 10. A passage between the reservoir 17 and the cavity 13 below it is sealed by a shutter 19. The shutter 19 is arranged in proximity to the second electrode 15. For example, a membrane formed from a thin polymer material with a low melting point may be used to seal the conductive, flowable material 18 within the reservoir 17 as shown.

In the situation shown in FIG. 1B, an overvoltage condition occurs between the first terminal 11 and the second terminal 12. Accordingly, a spark 20 is formed between the first terminal 14 and the second electrode 15. The heat associated with the spark 20, e.g. heated plasma, melts or otherwise destroys at least part of the shutter 19. In the embodiment shown in FIGS. 1A to 1C, essentially the entire membrane separating the reservoir 17 from the cavity 13 is destroyed. In another embodiment, only parts of the shutter 19 may be destroyed, thereby triggering a mechanical breakdown of the seal between the reservoir 17 and the cavity 13. For example, a fuse formed from a polymer material may be destroyed by the spark 20 and release a spring-loaded divider (not shown). In consequence, the conductive, flowable material 18, flows, under the effect of gravity into the cavity 13.

In the situation depicted in FIG. 1C, the lower part of the cavity 13 is filled with the conductive, flowable material 18 to such an extent that the conductive, flowable material 18 is in contact with both the first electrode 14 and the second electrode 15. Accordingly, a permanent, conductive path 21 is formed between the first terminal 11 and the second terminal 12. Contrary to high power semiconductor switching devices, no active cooling is required for the conductive path 21.

As an example, a metal material that is liquid at normal pressure and room temperature of 20° C. may be used. For example, mercury and certain gallium-based metal alloys, such as a gallium, indium, and tin-alloy also known as Galinstan, have a melting point of approximately −39° C. and −19° C., respectively, have a low electrical resistance. Depending on the operating conditions, also metals or metal alloys having a slightly higher melting point, such as gallium having a melting point of approximately 30° C., may be used in case the HV bypass device 10 is installed in a converter or other part of a HV electrical installation that constantly operates above a melting point of the respective metal.

As another example, a powder or granular material may be used as conductive, flowable material 18. For example, relatively small copper particles having particle sizes in the micrometer range, may be used to form the electrical pathway 21. If a relatively fine powder is used, a high current flowing through the bypass device may in turn melt parts of the powdered substance filling the gap between the electrodes, and form a conductive path 20 with an improved, lower electrical resistance compared to the original powder.

FIGS. 2A to 2C show an alternative implementation of a second high voltage bypass device 10. Most components of the high voltage bypass device 10 according to FIGS. 2A to 2C correspond to the respective components of the high voltage bypass device 10 shown in FIGS. 1A to 1C. Accordingly, only the differences are described here.

Unlike in the first embodiment, in the second high voltage bypass device 10 shown in FIG. 2A, the first and second terminals 11 and 12 form opposite sidewalls of the bypass device 10. Accordingly, the first electrode 14 and the second electrode 15 protrude from the respective sidewalls towards the centre of the cavity 13. The bottom of the cavity 13 is formed by an insulating bottom part 22. The flowable material 18 is arranged in a reservoir 17 formed in as an insulating top part 23 of the bypass device 10. Depending on the flowable material 18 used, the reservoir 17 may be open on top as shown as sealed with a lid (not shown).

As before, the shutter 19 is arranged over and in proximity to a direct line between the two electrodes 13 and 14 forming a spark gap 16. As shown in FIG. 1B, a spark 20 is formed in case of an overvoltage condition between the first terminal 11 and the second terminal 12. In consequence, the shutter 19 will be partially or completely destroyed, and the flowable material 18 will partially or completely fill the cavity 13 arranged underneath the reservoir 17. As shown in the specific embodiment of FIG. 2C, the conductive, flowable material 18 essentially fills the entire cavity 13.

FIG. 3 shows parts of a HV installation comprising a bypass device 10 according to the present disclosure. In particular, a single switching cell 30, which may be used in a voltage source converter, such as a modular multi-cell converter (MMC) as described later, is depicted.

The switching cell 30 shown in FIG. 3 comprises a half bridge 31 consisting of a voltage source 32 represented by a capacitor in FIG. 3 and two IGBTs 33a and 33b connected in series between the two terminals of the voltage source 32. Each IGBT 33a and 33b also has a corresponding diode 34a and 34b, respectively, which conducts current in a reverse direction. This may take the form of an integrated body diode or an external diode.

Between the two IGBTs, an electrical contact 35 is formed, which may be used, for example, to output a voltage generated by the half bridge 31 to the HV installation (not shown).

In case the lower IGBT 33a of the half bridge 31 shown in FIG. 3 cannot be activated, i.e. closed, the entire switching cell 30 would permanently disconnect an electrical path between an electrical reference contact 36 and the electrical contact 35. Accordingly, a converter or other part of electrical installation comprising said switching cell 30 would block any current to be transmitted.

To avoid this situation, according to FIG. 3, a bypass device 10, such as the bypass device detailed above with regard to FIGS. 1A to 2C, is installed in parallel to the first IGBT 33a. As detailed above, in case the lower IGBT 33a cannot be activated, i.e. by providing a corresponding gate voltage to its control gate, an overvoltage condition will occur between the electrical contact 35 and the reference contact 36. Accordingly, a spark 20 will be triggered within the spark gap 16 of the bypass device 10, thereby releasing the conductive, flowable material 18 to form a permanent conductive path 21 through the bypass device 10 (see also steps S1 to S5 of FIG. 7). This in effect shortens the switching cell 30 and maintains an electrical pathway between the reference contact 36 and electrical contact 35. Current can flow freely past cell 30, thus enabling the whole converter to continue operation.

As detailed above, the shutter 19 may be formed from a polymer material that is essentially destroyed in case of an overvoltage condition. Accordingly, the electrical bypass device 10 may only be triggered a single time. It may therefore also be referred to as a sacrificial component, in particular a sacrificial spark-short device.

While the bypass device 10 is relatively simple in its setup, and therefore cheap to manufacture, it may be desirable to implement an additional way of bypassing the first IGBT 33a in a controlled manner. Accordingly, in the embodiment depicted in FIG. 3, an additional, mechanical bypass switch 37 may be connected in parallel to the first IGBT 33a and the bypass device 10. The mechanical bypass switch 37 may be controlled by a corresponding control circuit (not shown). In case the control circuit determines that the switching cell 30 should be deactivated or that the IGBT 33a cannot be activated successfully, the mechanical bypass switch 37 may be closed to establish an electrical pathway between the reference contact 36 and the electrical contact 35.

Preferably, the mechanical bypass switch 37 is activated by the control circuit before a spark 20 is formed in the bypass device 10. In such a configuration, the sacrificial bypass device 10 will only be activated if both the first IGBT 33a as well as the mechanical bypass switch 37 fail together. In practice, the switching cell 30 or the IGBT 33a will have a specific voltage rating, for example 1 kV or 3 kV. In case of an IGBT failure, the mechanical bypass switch 37 will be triggered by the monitoring circuit. The gap between the first electrode 14 and the second electrode 15 of the bypass device 10 may be configured to be triggered only once the voltage potential between the electrical contact 35 and the reference contact 36 exceeds twice the rated voltage of the IGBT 33a. In operation, this situation may occur within 10 ms of the mechanical bypass switch 37 failing.

Figure 4:
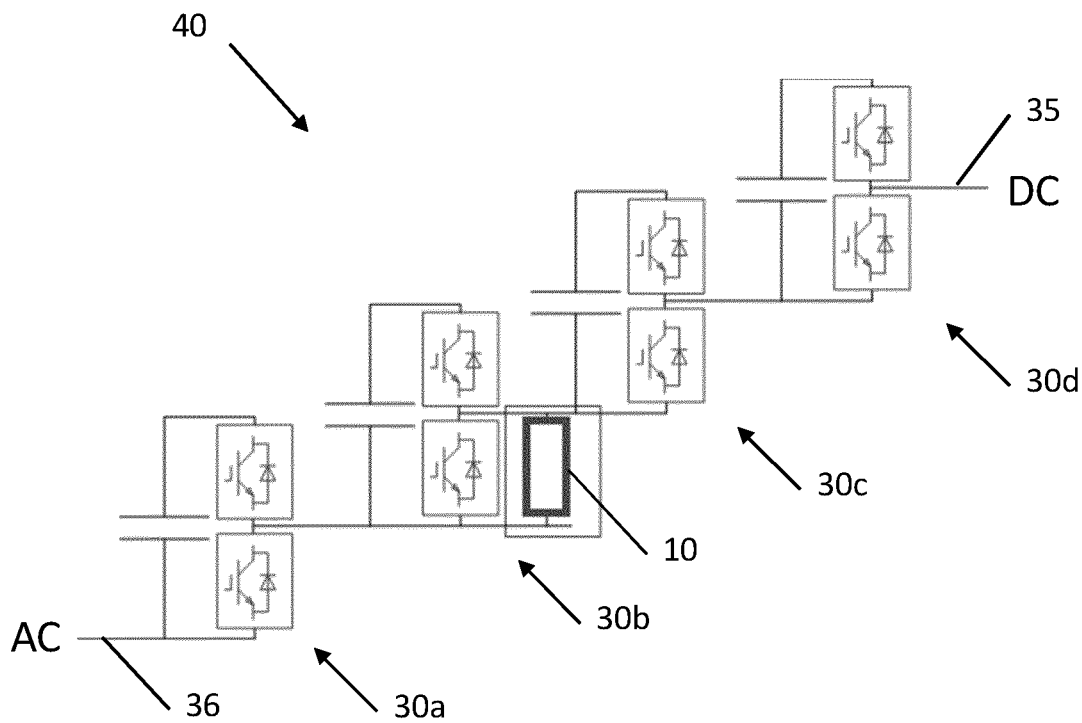
FIG. 4 shows a schematic circuit diagram of part of a modular multi-cell converter comprising multiple switching cells.

FIG. 4 shows how multiple switching cells 30 may be combined to form a Modular Multi-Cell Converter 40. In the depicted embodiment, the Modular Multi-Cell Converter 40 comprises a total of four, series-connected switching cells 30a to 30d. Therein, the reference contact of each switching cell is connected to the electrical contact of the previous switching cell. The reference contact 36 of the first switching cell 30a is connected to an electrical reference potential, such as an external voltage provided by a HV transmission line. The electrical contact 35 of the last switching cell 30d may in turn be connected to an output of the MMC 40, e.g. a DC network into which energy from a HVAC network is to be provided.

Each of the switching cells 30a to 30d of the MMC 40 may comprise one of the bypass devices 10 as described above. For reasons of clarity, only a single bypass devices 10 is shown for the second switching cell 30b. If one of the IGBTs 33 of any one of the switching cells 30 fails, an electrical transmission from the external reference potential to the output line is still possible, by means of the respective bypass device 10. While the failure of, for example, the second switching cell 30b will negatively affect the performance of the MMC 40, it may still remain operational and thereby allow the control shutdown or repair of the failed part of the converter.

FIGS. 5A to 5C show an alternative implementation of a third high voltage bypass device 10. Most components of the high voltage bypass device 10 according to FIGS. 2A to 2C correspond to the respective components of the high voltage bypass device 10 as shown in FIGS. 1A to 1C and 2A to 2C. Accordingly, only the differences are described here.

Unlike in the first and second embodiment, in the third high voltage bypass device 10, a varistor 50 is employed as a trigger element. The varistor 50 is place in a central part of the cavity 13, underneath and physically separated from a shutter 19. As can be seen in FIG. 5A, the terminals of the varistor 50 are electrically connected with the (external) first and second terminals 11 and 12 of the bypass device 10, respectively. In the depicted embodiment, the terminals of the varistor 50 are in direct contact with a first electrode 14 and a second electrodes 15, respective, forming respective conductive parts of the sidewalls 51 of the cavity 13. The electrodes 14 and 15 are in turn electrically connected to or integrally formed with the first and second terminals 11 and 12.

As is well known, the resistance of varistors changes dependent on a voltage across them. Varistors are ceramic components with nonlinear electric properties. In general, a varistor, also known as a surge arrester, remains non-conductive or highly ohmic during normal operation when a voltage across it remains well below a threshold voltage, also known as its clamping voltage. At voltages above this threshold, also known as switching voltage, a varistor become conductive. In standard application, such as overvoltage protection, varistors are used to absorb a given maximal amount of energy. However, if the energy is higher than this maximum amount, a strong temperature rise and even a thermal runaway occurs.

In the third embodiment, the varistor 50 is pushed on purpose to thermal runaway, so that a considerable amount of heat is generated by the varistor 50. Hence, when an overvoltage condition occurs across the terminals 11 and 12, the varistor 50 gets hot and triggers the shutter 19, e.g. by causing it to melt or evaporate, etc.

As before, the shutter 19 is arranged over and in proximity to the trigger element formed by the varistor 50. As shown in FIG. 5B, heat 52 is generated and dissipated in case of an overvoltage condition between the first terminal 11 and the second terminal 12. In consequence, the shutter 19 will be partially or completely destroyed, and the flowable material 18 will partially or completely fill the cavity 13 arranged underneath the reservoir 17. As shown in the specific embodiment shown in FIG. 5C, the conductive, flowable material 18 essentially fills the entire cavity 13.

In the situation shown in FIG. 5C, the varistor 50 is effectively bypassed by the conductive, flowable material 18, which directly contacts the electrodes 14 and 15, which form respective conductive parts of the sidewalls 51 of the cavity 13. The varistor 50 itself may be partially or completely destroyed by the thermal runaway condition. This, however, is immaterial to the formation of the electrical bypath by the conductive, flowable material 18.

Figure 6A:
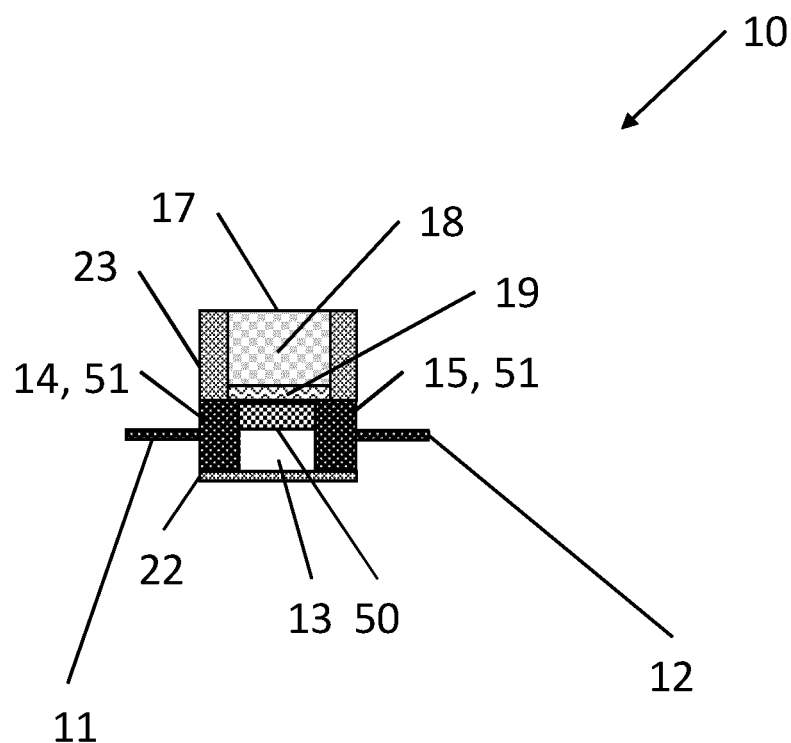
FIGS. 6A to 6C show different cross-sections through a fourth HV bypass device before and after occurrence of an overvoltage condition.
Figure 6B:
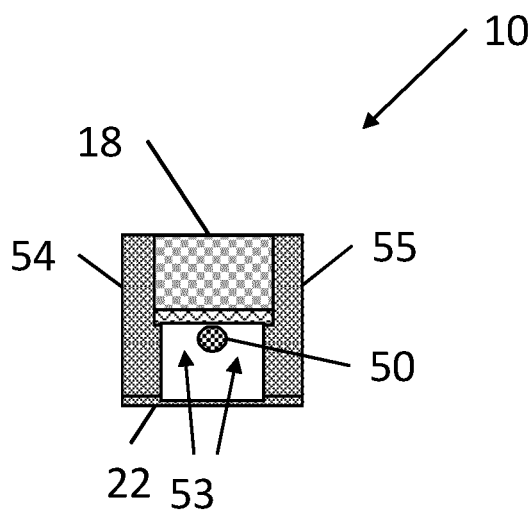
Figure 6C:
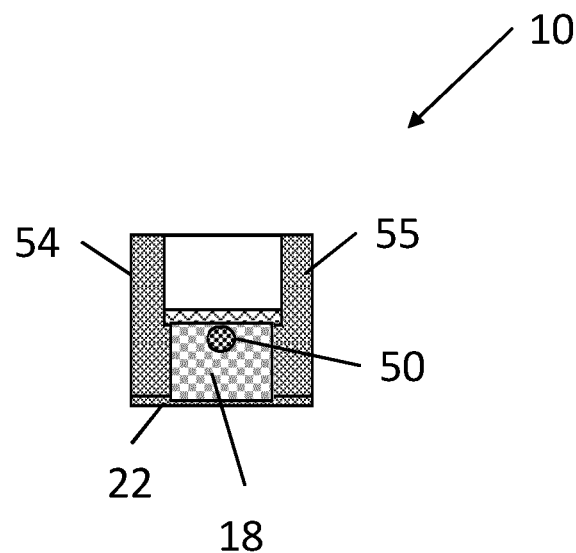

FIGS. 6A to 6C show an alternative implementation of a fourth high voltage bypass device 10. Most components of the high voltage bypass device 10 according to FIGS. 6A to 6C correspond to the respective components of the high voltage bypass device 10 shown in FIGS. 5A to 5C. Accordingly, only the differences are described here.

As describe before, a varistor 50 is used as trigger element in the fourth high voltage bypass device 10. Contrary to the previous embodiment, the varistor 50 is arranged in direct thermal contact with the shutter 19. Thus, heat generated by the varistor 50 in response to an overvoltage condition acts directly on the shutter material. This will generally lead to a fast response time. Moreover, such a configuration may be useful in scenarios where the cavity is filled with vacuum or a protective gas with poor thermal properties.

As shown in the cross section of FIG. 6B, the varistor 50 does not extend over the entire depth of the cavity 13, leaving open areas 53 between the varistor 50 and an insulating front wall 54 and/or an insulating back wall 55 before the shutter 19 is released.

As shown in the cross section of FIG. 6C, upon triggering of the varistor 50, the shutter 19 is at least partially destroyed, and the flowable material 18 runs through the open areas 53 to partly or completely fill the cavity 13.

Figure 7:
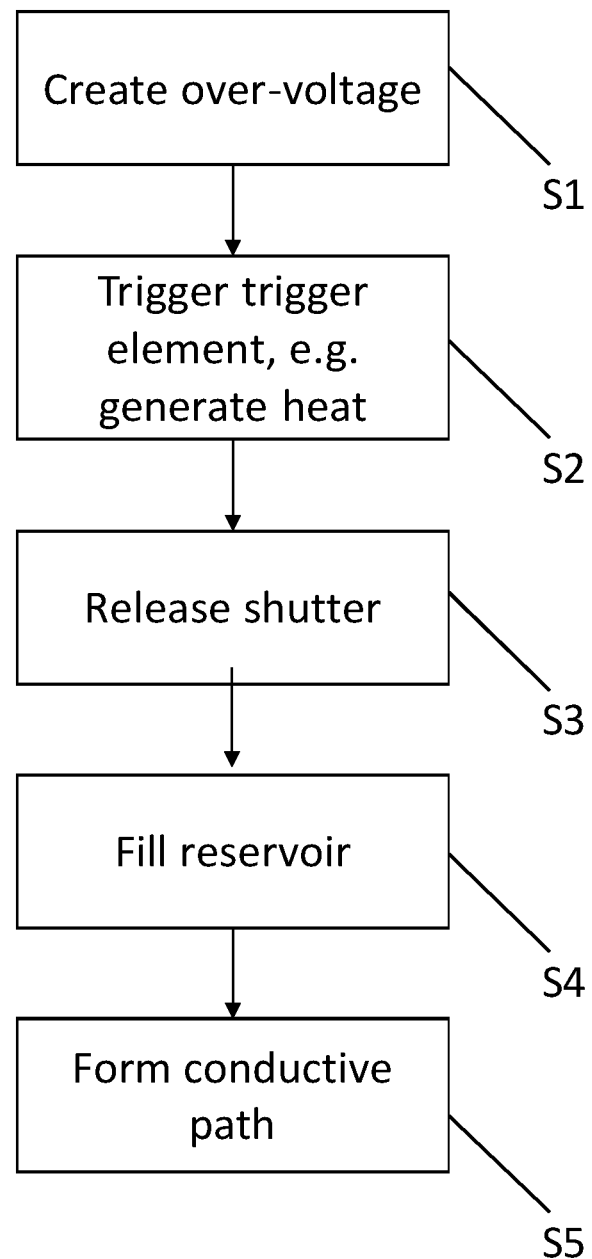
FIG. 7 shows, in a schematic manner, a method for operating a HV bypass device.

FIG. 7 once more shows, in a schematic manner, the steps occurring during activation of the bypass device 10.

In a first step S1, an overvoltage occurs across the bypass device 10. Attention is drawn to the fact that the creation of the overvoltage may occur automatically as a consequence of the failure of another component, such as the failed activation of a mechanical bypass switch.

In step S2, a trigger element connected to two terminals 11 and 12 carrying the overvoltage is triggered. For example, heat may be generated by the trigger element in response to the overvoltage condition. For example, if a voltage potential between the first terminal 11 and the second terminal 12 exceeds a predefined voltage, a spark 20 will be generated between the two electrodes 14 and 15. Alternatively, a thermal runaway condition in a varistor 50 or similar electrical component may be used to generate heat, e.g. by ohmic heating.

In a step S3, a shutter 19 separating a flowable material 18 from a corresponding cavity 13 will be released in response to the trigger event of step S2. For example, a shutter 19 comprising a heat sensitive material may be released by the heat generated through arcing, i.e. a spark 20, or a thermal runaway conduction of the trigger element. For example, creation of a spark 20 may cause the local creation of a hot plasma, which will in turn melt, evaporate or combust the polymer material, thereby releasing the shutter 19. Similarly, a thermal runaway situation of the varistor 50, also release an amount of heat sufficient to melt, evaporate or combust the polymer material.

In absence of the shutter 19, in a step S4, the conductive, flowable material 18 will fill the cavity 13 arranged on the other side of the destroyed shutter 19. This may occur naturally, due to the effect of gravity acting on the flowable material 18, or may be aided or performed by an external force, such as spring-loaded mechanism.

Once the conductive, flowable material 18 has filled the space between the first terminal 11 and the second terminal 12 to a sufficient degree, for example by touching the first electrode 14 and the second electrode 15, a solid or liquid conductive path 21 is formed.

While the disclosure is amenable to various modifications and alternative forms, specifics thereof have been shown by way of example in the figures and will be described in detail. It should be understood, however, that the intention is not to limit the disclosure to the particular embodiments described. On the contrary, the intention is to cover all modifications, equivalents, and alternatives falling within the scope of the disclosure defined by the appended claims.

For example, while the invention has been described with respect to a half bridge 31 and a MMC converter 40, it may equally be applied in a full bridge and/or another type of power converter.

REFERENCE SIGNS 10 bypass device
11 first terminal
12 second terminal
13 cavity
14 first electrode
15 second electrode
16 spark gap
17 reservoir
18 flowable material
19 shutter
20 spark
21 conductive path
22 insulating bottom part
23 insulating top part
30 switching cell
31 half bridge
32 voltage source
33a/b IGBT
34a/b body diode
35 electrical contact
36 reference contact
37 mechanical bypass switch
40 modular multi-cell converter
50 varistor
51 conductive part of the sidewall
52 heat
53 open area
54 insulating front wall
55 insulating back wall

The invention claimed is:

1. A high voltage bypass device, comprising:
a cavity;
a trigger element arranged in the cavity and connected to a first terminal and a second terminal of the high voltage bypass device;
a reservoir filled with a conductive, flowable material; and
a shutter separating the cavity and the reservoir, wherein the shutter is configured to open a passage between the cavity and the reservoir in case the trigger element is triggered by an overvoltage condition, such that the conductive, flowable material at least partly fills the cavity thereby forming a conductive path from the first terminal to the second terminal,
wherein the trigger element comprises at least one of the following:
a first electrode connected to the first terminal, and a second electrode connected to the second terminal, each of the first electrode and the second electrode protruding into the cavity to form a spark gap between the first electrode and the second electrode, underneath the shutter, such that a spark is generated in the spark gap in case of an overvoltage condition; and/or
a varistor connected between the first terminal and the second terminal.

2. The device of claim 1, wherein the conductive, flowable material comprises at least one of the following:
a liquid, a powder, and a granular material; and/or
a metal or metal alloy, in particular gallium, Galinstan, mercury, aluminum or copper.

3. The device of claim 1, wherein the trigger element is configured to generate heat in case of an overvoltage condition and the shutter comprises a heat sensitive material, in particular a polymer material, which is at least partially destroyed by one of melting, evaporation or combustion.

4. The device of claim 3, wherein the shutter comprises one of a heat sensitive membrane separating the cavity and the reservoir, or a heat sensitive trigger coupled to a spring loaded divider separating the cavity and the reservoir.

5. The device of claim 1, wherein the reservoir is arranged above the cavity in a mounted position of the device, such that the conductive, flowable material is released by gravity when the trigger element is triggered.

6. The device of claim 1, wherein the trigger element comprises the first electrode and the second electrode, wherein the first electrode is arranged at a bottom part of the cavity and protrudes upwards, and wherein the second electrode is arranged at a top part of the cavity, in proximity to the shutter, and protrudes downwards.

7. The device of claim 1, wherein the cavity is filled with one of vacuum or a protective gas before the trigger element is triggered.

8. The device of claim 1, wherein the conductive, flowable material is configured to form a permanent electrical path between the first terminal and the second terminal after the trigger element is triggered, in particular by one of: flooding the cavity with a conductive liquid; or by contacting the first electrode and the second electrode extending into or bounding the cavity with a granular conducting medium.

9. The device of claim 1, wherein the trigger element comprises the first electrode and the second electrode, wherein the first electrode is arranged at a first wall of the cavity and protrudes towards an opposite, second wall of the cavity, and wherein the second electrode is arranged at the second wall of the cavity and protrudes towards the first wall of the cavity, wherein a direct path between the first and second electrode is in proximity to the shutter.

10. The device of claim 1, wherein the trigger element comprises the varistor, and wherein the varistor is arranged in a central part of the cavity underneath the shutter.

11. The device of claim 1, wherein the trigger element comprises the varistor, and wherein the varistor is arranged in direct thermal contact with the shutter.

12. A voltage source converter (VSC) in particular a modular multi-cell converter (MMC), comprising:
at least one switching cell configured to switch a high voltage; and
at least one high voltage bypass device according to claim 1 configured to bypass the at least one switching cell in case of a failure.

13. The VSC of claim 12, wherein the switching cell comprises at least one power semiconductor switching device, in particular an IGBT, and the high voltage bypass device is connected in parallel to the at least one power semiconductor switching device.

14. The VSC of claim 12, wherein the switching cell further comprises at least one mechanical bypass switch connected in parallel to the at least one power semiconductor switching device and the high voltage bypass device.

15. The VSC of claim 12, wherein the at least one switching cell has a voltage rating in excess of 1 kV, preferably in excess of 3 kV, and/or a current rating in excess of 100 A, preferably in excess of 1000 A.

16. The VSC of claim 12, wherein:
the at least one high voltage bypass device is triggered by an overvoltage exceeding a voltage rating of the switching cell by a factor of two or more;
the at least one high voltage bypass device has an activation time of less than 10 ms for bypassing the at least one switching cell in case of an overvoltage condition; and/or
the at least one high voltage bypass device is configured to bypass the at least one switching cell for a period exceeding 24 hours, preferably exceeding 168 hours.

17. An operating method for a high voltage bypass device, comprising:
triggering a trigger element connected to two terminals of the bypass device in case of an overvoltage condition, in particular by creating heat through a spark or ohmic heating;
at least partially destroying, in particular by melting, evaporating or combusting, a shutter of the bypass device in response to triggering the trigger element, thereby releasing a conductive, flowable material; and
at least partially filling a cavity of the bypass device with the conductive, flowable material, thereby creating a permanent electrical path between a first terminal and a second terminal of the bypass device,
wherein the trigger element comprises at least one of the following:
a first electrode connected to the first terminal, and a second electrode connected to the second terminal, each of the first electrode and the second electrode protruding into the cavity to form a spark gap, between the first electrode and the second electrode, underneath the shutter, such that a spark is generated in the spark gap in case of an overvoltage condition; and/or
a varistor connected between the first terminal and the second terminal.

* * * * *